June 4, 1963 W. SCHLAPP 3,092,001
ADJUSTABLE OBJECTIVE CAMERA
Filed Nov. 28, 1960 3 Sheets-Sheet 1

INVENTOR
WERNER SCHLAPP
BY
Toulmin & Toulmin
Attorneys

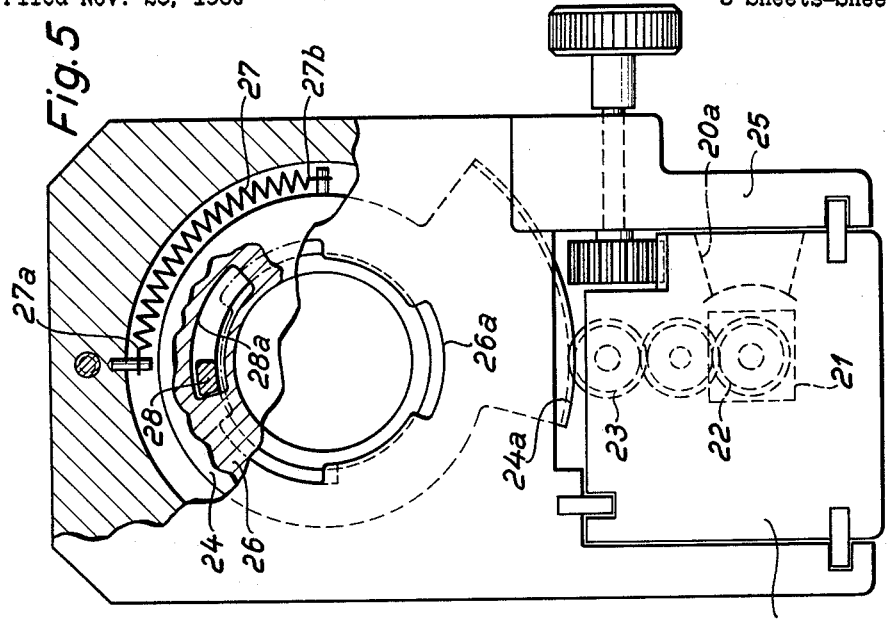
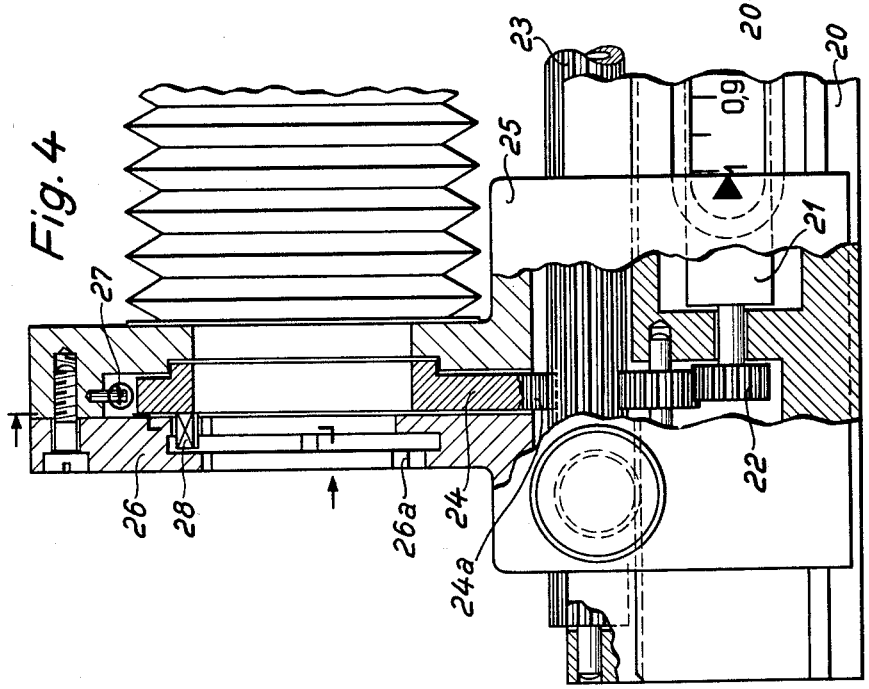

June 4, 1963 W. SCHLAPP 3,092,001
ADJUSTABLE OBJECTIVE CAMERA
Filed Nov. 28, 1960 3 Sheets-Sheet 3

INVENTOR
BY WERNER SCHLAPP
Toulmin & Toulmin
Attorneys

United States Patent Office 3,092,001
Patented June 4, 1963

3,092,001
ADJUSTABLE OBJECTIVE CAMERA
Werner Schlapp, Asslar, near Wetzlar (Lahn), Germany, assignor to Ernst Leitz Gesellschaft mit beschrankter Haftung, Wetzlar (Lahn), Germany
Filed Nov. 28, 1960, Ser. No. 72,088
Claims priority, application Germany Dec. 9, 1959
3 Claims. (Cl. 95—45)

The present invention relates to a camera of the adjustable objective type having a bellows, more particularly to the structure for positioning into reading position the scale corresponding to the objective used.

It has been known to provide a bellows interconnecting an adjustable objective and a camera. This permits the further adjustment of the objective with respect to the camera by extending the distance which can be achieved between the plane of the film of the camera and the principal plane of the objective lens. This extension of the distance between the lens and the film makes possible an image or picture scale of 1:1. In the usual arrangement the objective is mounted in an objective carrier which is slideably mounted on a guide structure which is rigidly connected to the camera. The optical axis of the adjustable objective is coaxial with the center of the image field in the camera casing.

The adjustable objective structure usually includes means which will enable the user of the camera to determine the image scale resulting from the use of an objective of a particular focal length and the distance at which this objective is positioned from the camera casing. It is also possible to determine the exposure time from this relationship of the focal length of the objective and the position of the objective.

One such structure comprises a scale having millimeter divisions and mounted on the guide structure so as to cooperate with the position of the adjustable objective of the camera. Thus, by reading the scale marking corresponding to the position of the adjustable objective, the image scale can be determined by using a reference table which has been previously calculated for objectives of various focal lengths.

It has also been proposed to provide the guide structure scale with graduations corresponding to the image scales resulting from various positions of the objective. Should an objective of another focal length be used, the image scale corresponding to the other focal length can be determined by using a table which has been previously calculated.

A further improvement comprised using interchangeable scales corresponding to objectives of various focal lengths.

When interchangeable scales are used, however, this means that the user must carry a number of scales with him and must insert the proper scale corresponding to the focal length of the objective. In addition, there was the possibility of one of the scales becoming misplaced or lost.

Where a scale in millimeters is employed it is possible that interpolation may lead to errors and the calculations necessary to relate a reading to a reference table may also lead to errors.

The present invention is directed to eliminate the above disadvantages by providing a single scale member having a plurality of scales thereon corresponding to the focal distances of the objective. This scale member, however, is so positioned that only one scale can be read at a time. Thus, by moving the scale member in position so that the visible scale corresponding to the focal length of the objective is used, the possibility of errors is eliminated and the user may directly read the image scale from the scale member.

In a modification of this invention the objective used is provided with a structure which coacts with gear means in such a manner that when the objective is positioned in the objective carrier, the gear means will automatically position the scale member so that the proper scale corresponding to the focal length of the objective is visible in the reading window.

It is therefore the principal object of this invention to provide a novel and improved adjustable objective structure for cameras.

It is another object of this invention to provide an improved structure for positioning the scale corresponding to the objective used in an adjustable objective camera.

Other objects and advantages of this invention will become apparent upon reference to the accompanying description when taken in conjunction with the following drawings, wherein FIGURE 1 is a side elevational view of an adjustable objective camera having a bellows interconnecting the objective carrier and the camera casing;

FIGURE 4 is a side elevational view with portions thereof removed to show a modification of the structure wherein the scale member is drivingly connected so as to be actuated by the positioning of the objective;

FIGURE 5 is a front elevational view of the structure shownin FIGURE 4 and portions thereof removed to show details of the invention;

Figure 1:
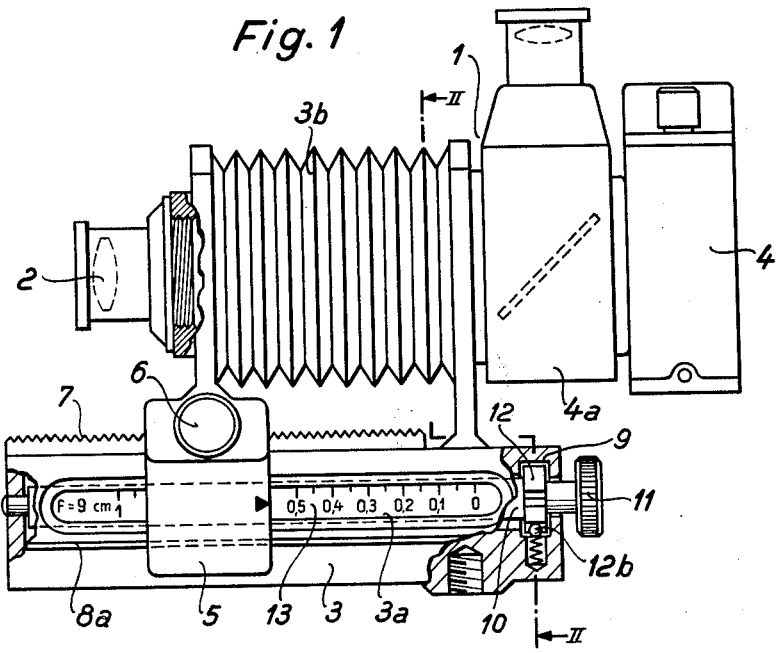
Figure 2:
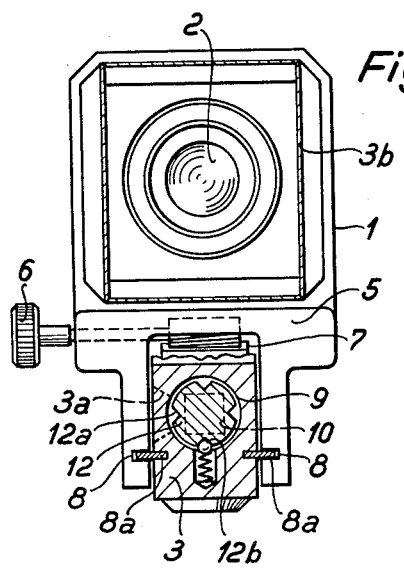
FIGURE 2 is a sectional view, taken along the line II—II of FIGURE 1.
Figure 3:
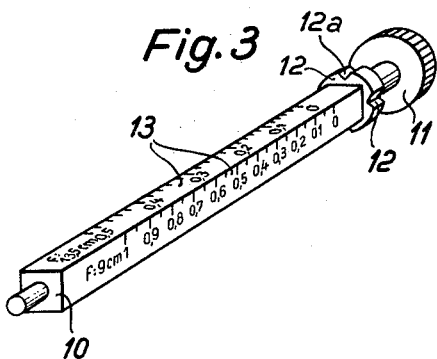
FIGURE 3 is a perspective view of the scale member utilized in the embodiment of the invention illustrated in FIGURES 1 and 2.
Figure 6A:
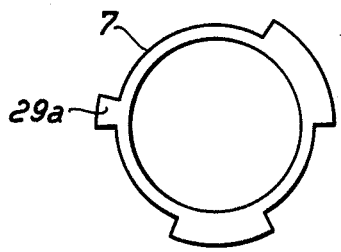
FIGURES 6a through 6d show the flanges on four objectives having different focal lengths, wherein one of the flanges is indicative of the focal length of the objective.
Figure 6B:
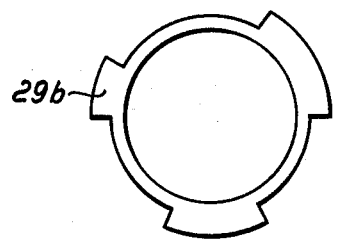
Figure 6C:
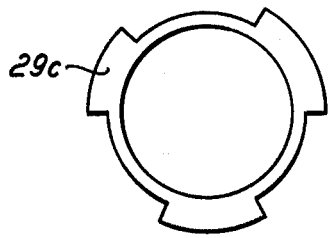
Figure 6D:
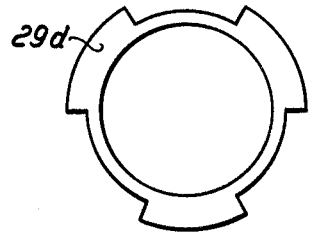

Returning now to the drawings wherein like reference symbols indicate the same parts throughout the various views, FIGURE 1 shows an adjustable bellows structure 1 which comprises an objective 2 in the front end thereof and a guide structure 3 which is rigidly connected to a camera 4 having a viewing structure 4a. An objective carrier 5 is slideably mounted on the guide structure 3 and is adjustable along the guide structure by means of a pinion 6 which cooperates with a rack 7 on the guide structure. The objective carrier 5 has longitudinally extending grooves 8 which receive tongues 8a mounted on the guide structure 3.

There is a longitudinally extending bore 9 in the guide structure 3 which bore is parallel to the optical axis of the objective 2. There is a slot 3a in one side of the guide structure which communicates with the bore 9 and serves as a reading window. A scale member 10, which has a square cross-section, is rotatably mounted in the bore 9. The scale member can also have a round or polygonal cross-section.

The scale member 10 has a control knob 11 at one end thereof and a circular member 12 which has a plurality of notches 12a in the periphery thereof. The notches 12a cooperate with a spring-actuated detent member 12b so that the scale member may be retained in an adjusted position. This adjusted position is such that one of the flat sides of the scale member will be visible through the reading window 3a. Each of the four sides of the scale member has a scale 13. These scales comprise picture or image scales corresponding to individual objectives of different focal lengths.

In using this embodiment of the invention the scale member is merely rotated by its control knob 11 so that the scale corresponding to the focal length of the objective used is visible in the reading window 3a. Thus, as can be seen in FIGURE 1, the image or picture scale is directly read through the reading window in the guide structure.

Proceeding next to FIGURES 4 and 5 there is illustrated a modification of this invention wherein a scale member 21 is rotatably mounted in a guide structure 20 and a gear 22 fixedly connected to one end thereof. Gear 22 is drivingly connected through a gear transmission with a gear roller 23 which is also rotatably mounted in the guide structure 20. The gear roll 23 meshes with a sector gear 24a which is integral with an indexing disk 24. Indexing disk 24 is pivotally mounted within an objective carrier 25 and is concentric to the optical axis of the objective. The disk 24 is retained in position by a ring 26 which has a plurality of bayonet slots 26a.

Integral with the indexing disk 24 is a projection 28 which extends through an arcuate slot 28a provided in the ring 26 in the objective carrier 25.

There is a spring 27 which has one end 27a fixedly mounted on the objective carrier 25 and the other end 27b being connected to the pivotally mounted indexing disk 24.

As may be seen in FIGURES 6a through 6d, each objective 2 has a flange 29a through 29d which varies in size, with the size being indicative of the size of the objective. The remaining two flanges 30 on each of the objectives are all equal in size.

Thus, the length of the flange 29a corresponds to the focal length so that when the objective is inserted through the bayonet slots 26a into position, the flange 29a will bear against the projection 28 and thus will rotate the indexing member.

Thus, in using the modification illustrated in FIGURES 4 and 5, an objective 2 having a predetermined focal length is inserted into position in the objective carrier. The objective is so inserted that the flange 29a is in the uppermost position as viewed in FIGURE 5. The flanges of the objective are inserted into the bayonet slots and the objective is then rotated through an angle so as to lock the objective in position. This locking of the objective will cause the flange 29a to bear against the projection 28 and thus to pivot the indexing disk a distance corresponding to the length of the flange 29a. This pivoting movement of the indexing disk 24 is then transmitted through the gear transmission to the scale member which is automatically rotated into the proper position so that the scale corresponding to the focal length of the objective is visible in the reading window.

It can be seen that when a scale member having four sides is used, the maximum rotation of the scale member will be 270°, whereas the minimum rotation will be 0°. A rotation of 0° will be required should an objective be inserted whose focal length is such that the flange 29a is either eliminated or will not move the indexing disk 24 from its initial position as shown in FIGURE 5.

One of the sides of the scale member 21 is appropriately provided with a scale graduated in millimeter divisions. This side may be either the side which is visible in the reading window after a maximum rotation of the scale member or a minimum rotation of the scale member. This arrangement is desirable in the event that objectives which do not have flanges for actuating the rotation of the scale carrier 21 are used. This arrangement thus would ensure that at least one scale in millimeters is visible or could be made to be visible.

Thus it can be seen that the present invention provides a simple and yet effective structure for rapidly and accurately determining the picture or image scale which corresponds to the adjusted position of an objective having a particular focal length.

It will be understood that this invention is susceptible to modification in order to adapt it to different usages and conditions and, accordingly, it is desired to comprehend such modifications within this invention as may fall within the scope of the appended claims.

What is claimed as this invention is:

1. In a camera, an objective guide structure attached to a camera, an objective carrier slidably mounted on said guide structure, an objective lens detachably mounted on said objective carrier, indicator means on said objective lens and shaped to indicate the focal length of the lens, and actuating ring pivotally housed in said objective carrier, an adjustable scale member mounted on said guide structure and having a plurality of scales thereon representing objectives of different focal lengths which scales can be selectively moved into position to indicate the adjusted position of the objective, a gear train permanently and drivingly interconnecting said actuating ring and said adjustable scale member, and a cam on said actuating ring and engageable with said indicator means so that inserting objective lenses of different focal length will adjust said scale member to the position wherein the scale corresponding to the objective lens will cooperate with the adjusted position of the objective carrier.

2. In a camera, an objective guide structure attached to a camera, an objective carrier slidably mounted on said guide structure, an objective lens detachably mounted on said objective carrier, indicator means on said objective lens and shaped to indicate the focal length of the lens, an actuating ring pivotally housed in said objective carrier, an adjustable scale member mounted on said guide structure and having a plurality of scales thereon representing objectives of different focal lengths which scales can be selectively moved into position to indicate the adjusted position of the objective, a gear train permanently and drivingly interconnecting said actuating ring and said adjustable scale member, said gear train including a gear having its rotary axis parallel to the optical axis of the camera so that the driving connection between said actuating ring and said scale member is maintained in different positions of said objective carrier, and a cam on said actuating ring and engageable with said indicator means so that inserting objective lenses of different focal length will adjust said scale member to the position wherein the scale corresponding to the objective lens will cooperate with the adjusted position of the objective carrier.

3. In a camera, an objective guide structure attached to a camera, an objective carrier sildably mounted on said guide structure, an objective lens detachably mounted on said objective carrier, indicator means on said objective lens and shaped to indicate the focal length of the lens, an actuating ring pivotally housed in said objective carrier and having a sector gear thereon, an adjustable scale member rotatably mounted in said guide structure with its rotary axis parallel to the optical axis of the camera, said scale member having a plurality of scales thereon representing objectives of different focal lengths to indicate the adjusted position of the objective, there being a gear on one end of said scale member, a gear train permanently and drivingly interconnecting said actuating ring sector gear and said scale member gear, said gear train including a gear having its rotary axis parallel to the optical axis of the camera so that the driving connection between said sector gear and said scale member gear is maintained in different positions of said objective carrier along its optical axis, and a cam on said actuating ring and engageable with said indicator means so that inserting objective lenses of different focal length will adjust said scale member to the position wherein the scale corresponding to the objective lens will cooperate with the adjusted position of the objective carrier.

References Cited in the file of this patent

UNITED STATES PATENTS

| | | |
|---|---|---|
| 2,124,550 | Evans | July 26, 1938 |
| 2,140,260 | Cunningham | Dec. 13, 1938 |
| 2,638,824 | Freund | May 19, 1953 |
| 2,878,717 | Anander | Mar. 24, 1959 |